US010589456B2

(12) United States Patent
Fabre et al.

(10) Patent No.: US 10,589,456 B2
(45) Date of Patent: Mar. 17, 2020

(54) INSTALLATION AND A METHOD FOR SHAPING AN AXISYMMETRIC FIBER PREFORM PRESENTING A PROFILE THAT VARIES IN RADIAL SECTION

(71) Applicant: SAFRAN AIRCRAFT ENGINES, Paris (FR)

(72) Inventors: Hubert Jean Marie Fabre, Melun (FR); Jérémy Hellot, La Celle Saint Cloud (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/325,916

(22) PCT Filed: Aug. 7, 2017

(86) PCT No.: PCT/FR2017/052204
§ 371 (c)(1),
(2) Date: Feb. 15, 2019

(87) PCT Pub. No.: WO2018/033671
PCT Pub. Date: Feb. 22, 2018

(65) Prior Publication Data
US 2019/0210251 A1    Jul. 11, 2019

(30) Foreign Application Priority Data

Aug. 16, 2016  (FR) ...................................... 16 57768

(51) Int. Cl.
*B29C 53/56*    (2006.01)
*B29C 70/56*    (2006.01)
(Continued)

(52) U.S. Cl.
CPC .............. *B29C 53/56* (2013.01); *B29B 11/16* (2013.01); *B29C 70/56* (2013.01); *B29L 2023/00* (2013.01)

(58) Field of Classification Search
CPC .......... B65H 2404/14; B65H 2404/112; B65H 2404/1121; B65H 2404/113;
(Continued)

(56) References Cited

U.S. PATENT DOCUMENTS 742,788 A * 10/1903 Hoberg ................... B21C 47/30
242/529
912,262 A * 2/1909 Pope ..................... B65H 75/242
242/529
(Continued)

FOREIGN PATENT DOCUMENTS

| DE | 10 2013 210034 A1 | 12/2014 |
| WO | WO 2006/136755 A2 | 12/2006 |
| WO | WO 2014/174193 A1 | 10/2014 |

OTHER PUBLICATIONS

International Preliminary Report on Patentability and the Written Opinion of the International Searching Authority as issued in International Patent Application No. PCT/FR2017/052204, dated Feb. 19, 2019.
(Continued)

*Primary Examiner* — Matthew J Daniels
(74) *Attorney, Agent, or Firm* — Pillsbury Winthrop Shaw Pittman LLP

(57) ABSTRACT

An installation for shaping an axisymmetric fiber preform presenting a profile that varies in radial section, includes a storage mandrel for storing a fiber texture in the form of a wound strip, one or more follower rollers, and an axisymmetric mold on which the fiber texture is to be shaped by being wound, the follower roller(s) being placed between the storage mandrel and the axisymmetric mold, the instal-
(Continued)

lation including at least one tension adjustment device for adjusting tension on the fiber texture, the device including at least one row of rods aligned in a first direction parallel to an axis of rotation of one or more follower rollers; each rod presenting an endpiece at a free end in order to come into contact with the fiber texture.

11 Claims, 6 Drawing Sheets

(51) Int. Cl.
*B29B 11/16* (2006.01)
*B29L 23/00* (2006.01)

(58) Field of Classification Search
CPC .......... B65H 2404/13; B65H 2404/131; B65H 2404/12; B65H 75/242; B65H 18/00; B65H 23/04; B65H 27/00; B29C 53/56; B29C 53/584; B29C 63/06; B29C 53/62; B29C 53/60; B29C 70/56; B32B 38/1825; B32B 38/1875
USPC ............... 242/168, 419.5, 529; 156/189, 496
See application file for complete search history.

(56) References Cited

U.S. PATENT DOCUMENTS

| | | | | |
|---|---|---|---|---|
| 926,715 A * | 6/1909 | Brooks | ................ | B65H 75/242 242/529 |
| 1,027,555 A * | 5/1912 | McFarlane | ........... | B65H 75/242 242/573.2 |
| 1,088,282 A * | 2/1914 | Hudson | ................... | B21C 47/30 242/529 |
| 1,175,204 A * | 3/1916 | Tucker | ................. | B65H 75/242 242/529 |
| 3,810,805 A * | 5/1974 | Goldsworthy et al. | ....................... | B29C 70/388 156/361 |
| 4,209,138 A * | 6/1980 | Cecchi | ................. | B65H 18/106 242/530.3 |
| 4,212,504 A * | 7/1980 | Krylov | .................... | B21B 13/14 100/162 R |
| 4,213,234 A * | 7/1980 | Ware | ...................... | B21D 53/30 156/189 |
| 4,218,029 A * | 8/1980 | Schwenzfeier | ...... | B65H 18/106 242/530.3 |
| 4,620,348 A * | 11/1986 | Guttinger | .............. | B21B 27/055 492/7 |
| 4,750,965 A * | 6/1988 | Pippel | ................... | B29C 70/388 156/361 |
| 4,954,204 A * | 9/1990 | Grimshaw | ............ | B29C 70/388 156/361 |
| 5,058,497 A * | 10/1991 | Bishop | ................ | B29C 63/0004 100/155 R |
| 5,279,470 A * | 1/1994 | Birkmann | ............ | B65H 75/242 242/530.3 |
| 5,454,897 A * | 10/1995 | Vaniglia | .................. | B29C 70/32 156/166 |
| 5,518,203 A * | 5/1996 | Annaka | .................. | B26D 1/245 242/530.3 |
| 5,522,785 A * | 6/1996 | Kedl | .................. | B65H 23/0216 226/174 |
| 5,785,271 A * | 7/1998 | Leskinen | ............... | B65H 18/20 242/530.1 |
| 5,823,927 A * | 10/1998 | Van Haag | .............. | D21G 1/022 492/7 |
| 5,853,139 A * | 12/1998 | Hehner | .................. | B65H 18/26 242/530.1 |
| 6,662,630 B2* | 12/2003 | Onnela | .................. | D21G 1/022 492/10 |
| 2004/0154146 A1* | 8/2004 | Pruitt, Jr. | ........... | B65H 23/0251 26/99 |

OTHER PUBLICATIONS

International Search Report as issued in International Patent Application No. PCT/FR2017/052204, dated Dec. 20, 2017.

* cited by examiner

INSTALLATION AND A METHOD FOR SHAPING AN AXISYMMETRIC FIBER PREFORM PRESENTING A PROFILE THAT VARIES IN RADIAL SECTION

CROSS REFERENCE TO RELATED APPLICATIONS

This application is the U.S. National Stage of PCT/FR2017/052204, filed Aug. 7, 2017, which in turn claims priority to French Patent Application No. 1657768 filed Aug. 16, 2016, the entire contents of all applications are incorporated herein by reference in their entireties.

BACKGROUND OF THE INVENTION

The present invention relates to shaping fiber preforms by winding a fiber texture that has been obtained by three-dimensional (3D) or multilayer weaving. Such fiber preforms constitute fiber reinforcing structures for composite material parts.

The invention relates more particularly to fiber preforms that are to form the reinforcement of axisymmetric composite material parts that present a profile in section that varies (varies in shape and/or thickness), such as for example an aeroengine fan casing. The fiber preform for such a part is made by weaving a fiber texture and winding that texture under tension onto an axisymmetric mold including a winding surface of radial section that includes a portion in relief corresponding to the profile of the part that is to be fabricated.

In order to make a fiber texture that is adapted to the varying shape of the injection mold, use is made of shape weaving, also referred to as "contour weaving" or "outline weaving", which consists in taking up different lengths of warp yarns as a function of their position across the width of the fiber texture that is being woven in the form of a strip, so as to obtain ratios between the warp yarn lengths (tangential direction) that are similar to the ratios between the radii defining the varying profile of the final part that is to be fabricated.

The fiber texture as woven in that way is stored on a storage mandrel for subsequent winding under tension onto an axisymmetric injection mold that includes a winding surface having in radial section a profile in relief that corresponds to the profile of the part to be fabricated. While the texture is being wound onto the mold, it is put under tension by the storage mandrel, which is also referred to as the "takeup" mandrel, with one or more follower rollers being placed between the storage mandrel and the injection mold. The follower roller(s) present(s) radii that vary across their axial width so as to define an outside surface or profile in relief that serves, between the storage mandrel and the injection mold, to conserve the yarn length ratios as defined during weaving. Conserving yarn length ratios thus serves to maintain uniform tension in the fiber texture.

While the fiber preform is being shaped on the mold, the fiber texture is rolled up through a plurality of turns. For each turn the ratio between the various radii defining the profile in relief changes as a function of the layers of fiber texture that have already been wound. These changes in profile are themselves greater when the shape and/or thickness ratios in the final part are large.

While the fiber texture is being wound onto the injection mold, it can become offset because of the differences between the woven profile and the real profile onto which it is being wound, thereby leading to losses of tension at certain axial positions across the texture. These unbalanced tensions across the width of the part can lead to defects such as waves, fibers buckling, fibers being pinched, zones of unwanted extra thickness, and out-of-specification fiber volume fractions. These tension unbalances can also complicate the shaping of the fiber texture by winding by giving rise in particular to the formation of creases or of misalignments, thereby causing the shaping of the fiber texture to be more arduous and to take longer.

OBJECT AND SUMMARY OF THE INVENTION

The invention seeks to provide a solution to the above-mentioned drawbacks.

To this end, the invention proposes an installation for shaping an axisymmetric fiber preform presenting a profile that varies in radial section, the installation comprising a storage mandrel for storing a fiber texture in the form of a wound strip, one or more follower rollers, and an axisymmetric mold on which the fiber texture is to be shaped by being wound, the follower roller(s) being placed between the storage mandrel and the axisymmetric mold, the storage mandrel, the follower roller(s), and the mold presenting radii along their axes of rotation that vary so as to define outside surfaces presenting respective profiles in relief, the installation comprising at least one tension adjustment device for adjusting tension on the fiber texture, said tension adjustment device comprising at least one row of rods aligned in a first direction parallel to an axis of rotation of one or more follower rollers:

each rod presenting an endpiece at a free end in order to come into contact with the fiber texture; and each rod being movable in a second direction orthogonal to said first direction.

By using one or more tension adjustment devices provided with movable rods having their movements servo-controlled in response to the tension measurements from the tension sensors fitted thereto, the installation of the invention makes it possible to shape fiber preforms of profile that varies in radial section in which losses or non-uniformities of tension are significantly reduced. Furthermore, the rods of the tension adjustment device of the invention may also be used for increasing tension locally in the fiber texture, e.g. in order to reduce expansion of the preform in a thicker zone (in order to avoid pinching and buckling).

These effects may be the result of the texture being wound onto the mold in order to be shaped or they may appear while closing the mold if the tension exerted on the texture was poorly applied, and they then become visible in the injected part. Advantageously, while being wound onto the mold, the fiber preform presents few defects (waves in the first turn to be wound, tension poorly applied giving rise to buckling and/or pinching of fibers while closing the mold, zones of undesired extra thickness, fiber volume fractions out of specification, creases, misalignments, etc.) compared with a fiber preform made in accordance with the prior art in which tension unbalances are greater. This serves to reduce unwanted stops of the winding machine as are usually necessary in order to correct defects such as creases or portions of the texture collapsing, which also require the machine to be reversed together with action to be taken by one or more technicians. Advantageously, such an installation also makes it possible to fabricate distinct fiber preforms that present similar profiles while using the same follower roller, i.e. without it being necessary to replace the follower roller, as is necessary in the prior art According to a first particular characteristic of the installation of the invention, each rod is fitted with a tension sensor configured to measure the tension acting on its endpiece, each rod being mounted on an actuator system configured to move the rod along the second direction as a function of the tension measurement from the sensor.

According to a second particular characteristic of the installation of the invention, the endpiece of each rod is rounded.

According to a third particular characteristic of the installation of the invention, the endpiece of each rod comprises a castor.

According to a fourth particular characteristic of the installation of the invention, at least one tension adjustment device is arranged before or after a follower roller, said adjustment device being maintained in a stationary position.

According to a fifth particular characteristic of the installation of the invention, said adjustment device is arranged between two follower rollers.

According to a sixth particular characteristic of the installation of the invention, at least one follower roller is fitted with a tension adjustment device, said tension adjustment device comprising a plurality of rows of rods distributed uniformly around the follower roller.

According to a seventh particular characteristic of the installation of the invention, said adjustment device includes a flexible membrane covering the endpieces of said rods of the rows of rods.

The invention also provides a method of shaping a fiber texture obtained by three-dimensional or multilayer weaving to form an axisymmetric fiber preform presenting a profile that varies in radial section, the fiber texture being shaped by being wound under tension onto an axisymmetric mold in order to obtain the fiber preform, the fiber texture being unwound from a storage mandrel, the fiber texture travelling over one or more follower rollers placed between the storage mandrel and the axisymmetric mold, the storage mandrel, each follower roller, and the mold presenting along their axes of rotation radii that vary so as to define an outside surface having a profile in relief, the method comprising a step of adjusting tension on the fiber texture via at least one tension adjustment device, said tension adjustment device comprising at least one row of rods aligned along a first direction parallel to an axis of rotation of the follower roller(s):

- each rod presenting an endpiece and a free end for coming into contact with the fiber texture;
- each rod being movable in a second direction orthogonal to said first direction; and
- each rod also being fitted with a tension sensor configured to measure the tension acting on its endpiece, each rod being mounted on an actuator system configured to move the rod along the second direction as a function of the tension measurement from the sensor; the step of adjusting the tension of the fiber texture being performed by a step of moving one or more rods following a step of measuring the tension exerted on the endpiece of each rod.

According to a first particular characteristic of the method of the invention, each rod is moved independently in response to the tension measurement from the tension sensor fitted thereto.

According to a second particular characteristic of the method of the invention, at least one follower roller is fitted with a tension adjustment device, said tension adjustment device comprising a plurality of rows of rods distributed uniformly around the follower roller, the method including a step of moving the rods arranged at the same axial position simultaneously in response to the tension measurements from the tension sensors fitted thereto.

BRIEF DESCRIPTION OF THE DRAWINGS

Other characteristics and advantages of the invention appear from the following description of particular embodiments of the invention given as non-limiting examples, and with reference to the accompanying drawings, in which.

DETAILED DESCRIPTION OF EMBODIMENTS

Figure 4:
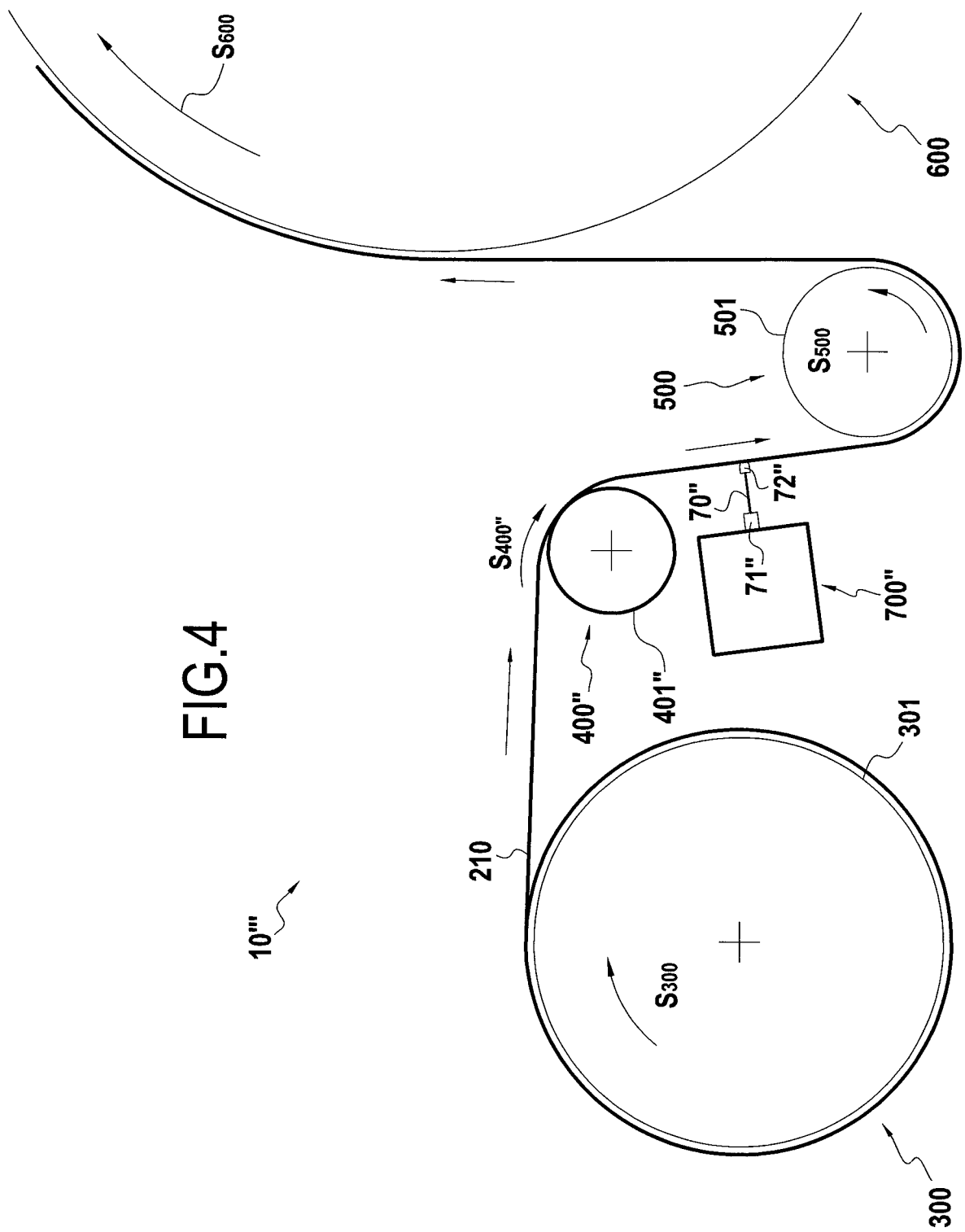
FIG. 4 is a diagrammatic view of an installation for shaping a fiber texture of varying shape in another embodiment.

The invention applies in general manner to making axisymmetric follower roller preforms that present, in radial section, a profile that varies and that are suitable for constituting fiber reinforcement, which preforms are for use in fabricating axisymmetric parts made of composite material likewise presenting a profile that varies and/or a thickness that varies, in particular in radial section. A radial section corresponds to a plane defined by the axial direction and the radial direction of the mold on which the preform is shaped. The axial direction DA and the radial direction $D_R$ are shown in FIG. 4. The parts are obtained by winding a fiber texture onto a mold, injecting a fluid composition, such as a resin, into the fiber preform as constituted in this way, and then subjecting said composition to heat treatment in order to obtain the matrix.

FIGS. 1, 2, 3, and 4 show installations 10, 10', 10", and 10'" for shaping a fiber preform of varying shape in accordance with various different embodiments of the invention. Each installation 10, 10', 10", and 10'" comprises a storage mandrel 300, one or more follower rollers 400, 400', 400", and 500 placed downstream from the mandrel 300 in the travel direction of the fiber texture, and an injection mold 600 arranged downstream from the follower roller 500.

Figure 1:
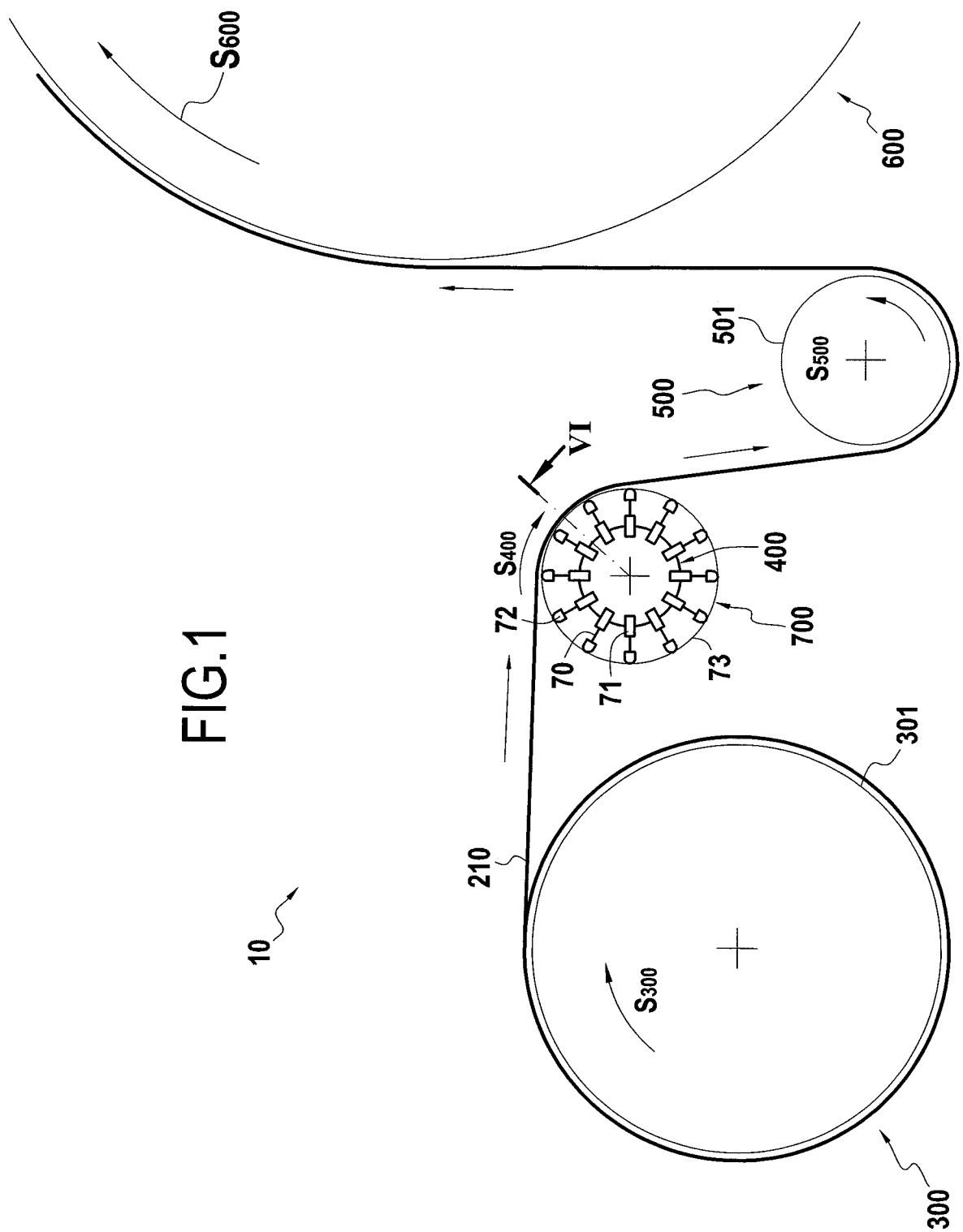
FIG. 1 is a diagrammatic view of an installation for shaping a fiber texture of varying shape in accordance with an embodiment of the invention.
Figure 2:
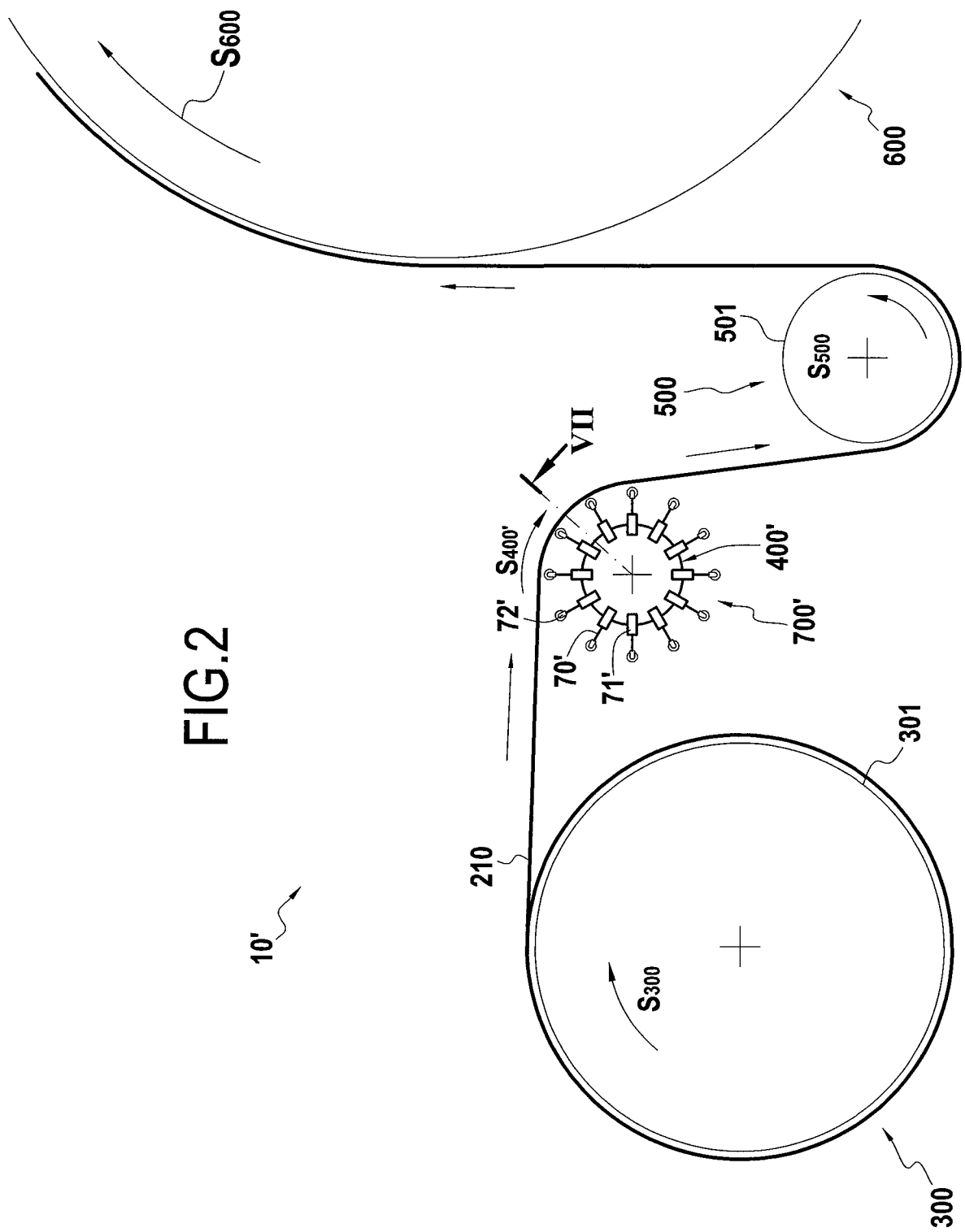
FIG. 2 is a diagrammatic view of an installation for shaping a fiber texture of varying shape in another embodiment.
Figure 3:
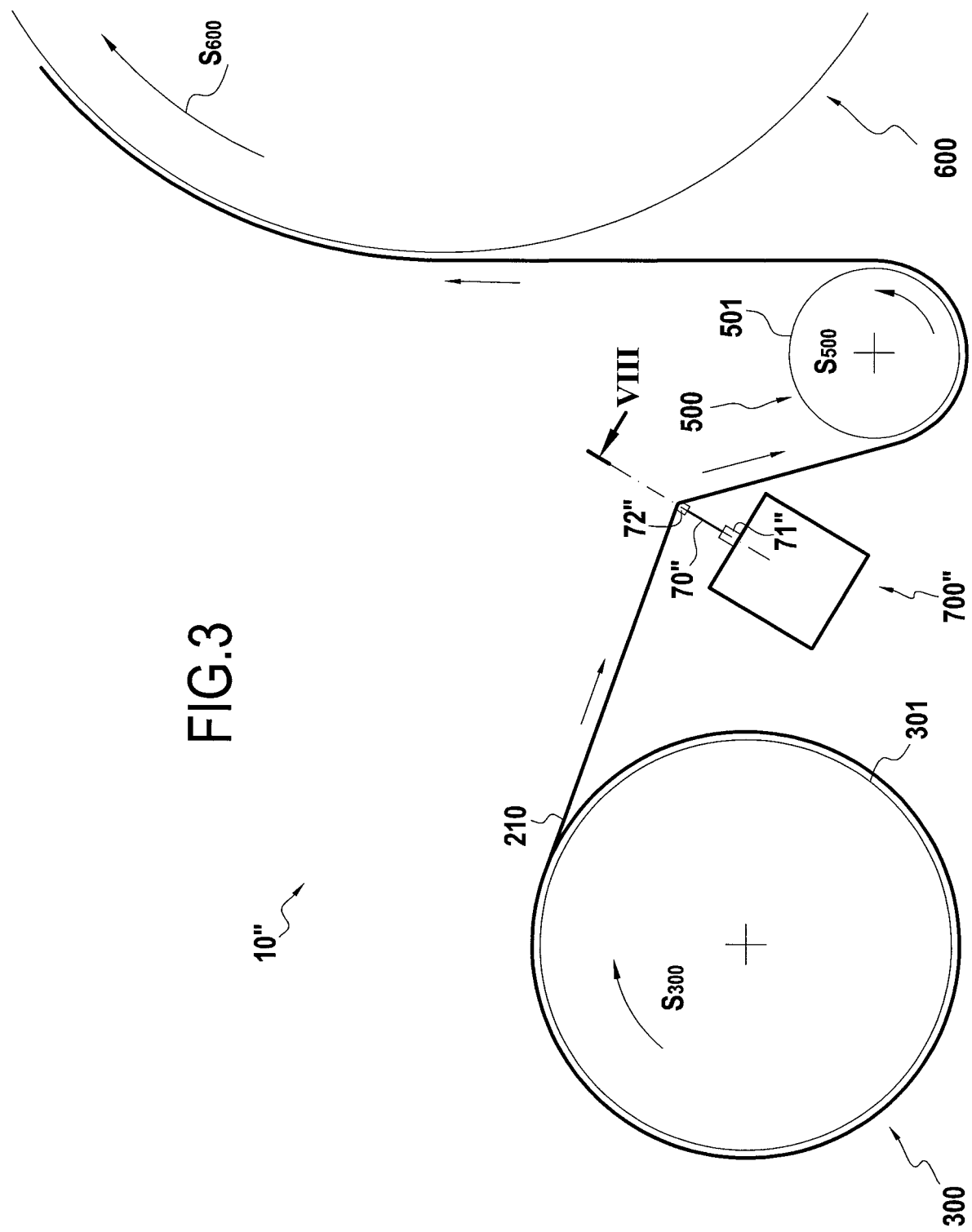
FIG. 3 is a diagrammatic view of an installation for shaping a fiber texture of varying shape in another embodiment.

By way of example, the installations 10, 10', and 10" of FIGS. 1, 2, and 4 comprise two follower rollers 400, 400", and 500, while the installation 10'" of FIG. 3 has only one follower roller 500.

A fiber texture 210 present on the storage mandrel 300 is unwound therefrom in order to be shaped by being wound onto the injection mold 600. In an embodiment, the winding may be carried out under tension that is controlled at the storage mandrel.

The fiber structure 210 is obtained by three-dimensional weaving or by multilayer weaving performed in known manner using a Jacquard type loom having arranged thereon a bundle of warp yarns or strands occupying a plurality of layers. The warp yarns are interlinked by weft yarns in the resulting structure.

The term "three-dimensional weaving" or "3D weaving" is used herein to mean a weaving technique in which at least some of the weft yarns interlink the warp yarns over a plurality of warp layers, or vice versa. The 3D weaving may be of the interlock type, as described in Document WO 2006/136755.

The term "multilayer weaving" is used herein for 3D weaving using a plurality of warp layers in which the base weave of each layer is equivalent to a conventional 2D weave, such as a plain, satin, or twill type weave, but with certain points of the weave that interlink warp layers, or vice versa.

Making the fiber structure by 3D or multilayer weaving makes it possible to obtain bonding between the layers, and thus to have good mechanical strength for the fiber structure and for the composite material part obtained therefrom, while using a single textile operation.

In particular, the fiber structure may be woven from yarns made of carbon fibers, of ceramic fibers such as silicon carbide fibers, of glass fibers, or indeed of aramid fibers.

In order to make a fiber texture that is adapted to the varying shape of the fiber preform that is to be shaped on the injection mold, use is made of shape weaving, also known as "contour weaving", that consists in delivering different lengths of warp yarns as a function of their positions across the width of the fiber texture being woven in the form of a strip. For this purpose, one or more delivery rollers are used at the outlet of the loom that present varying radii across the axial width so as to define an outside surface having a profile in relief that makes it possible to deliver different lengths of warp yarn as a function of the positions of the yarns across the width of the fiber texture, with a greater length of warp yarn being delivered by a portion of a delivery roller that has a radius that is greater than the remainder of the roller. The differential delivery performed by the delivery rollers has repercussions in the weaving cell of the loom by pulling the proper lengths of warp yarns prior to inserting the following column of weft yarns. The texture as woven in this way is wound onto a mandrel or storage drum that is also referred to as a "takeup" mandrel, and that is situated downstream from the takeup rollers. The fiber texture is thus stored in this way for subsequent shaping on a mold.

Figure 5:
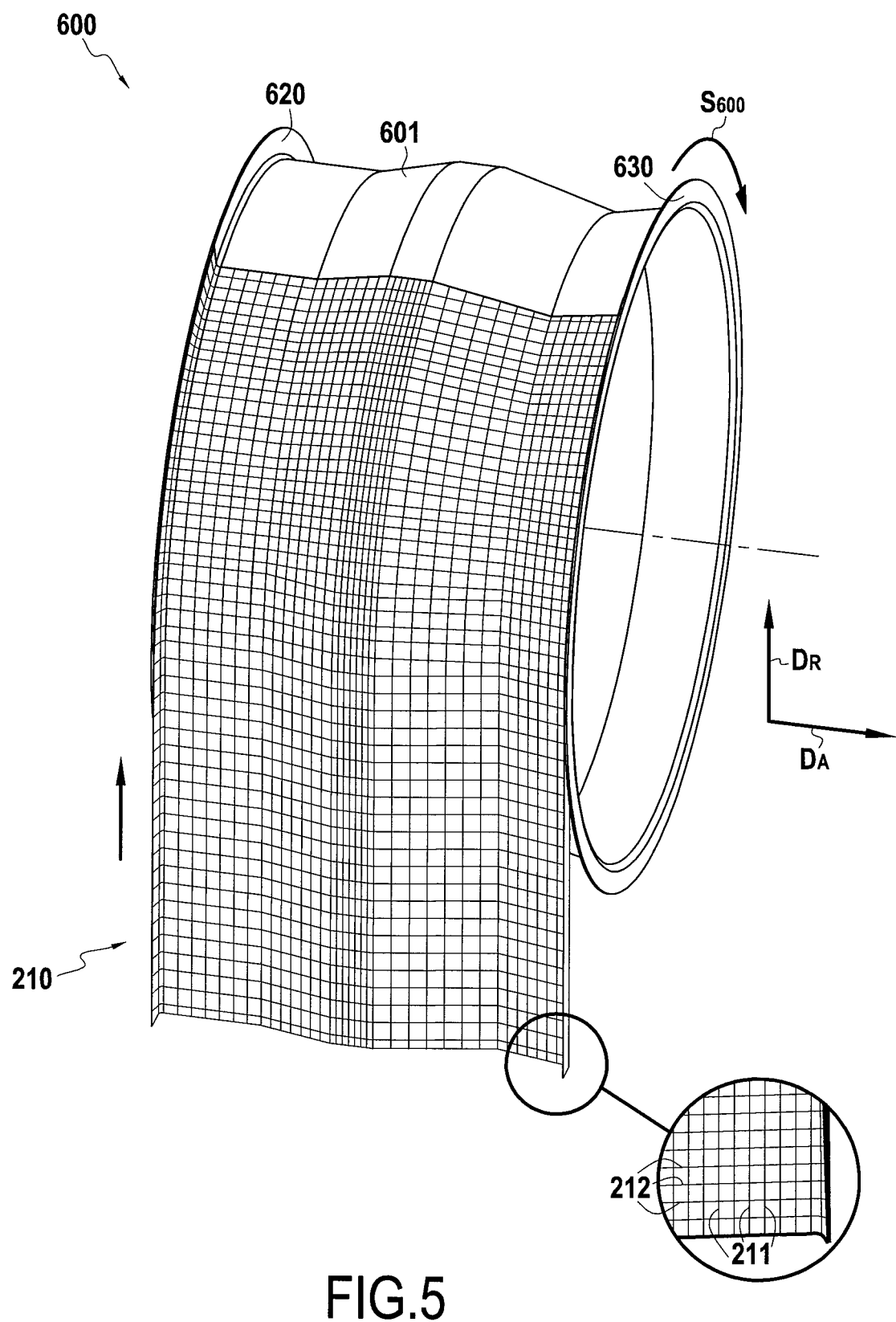
FIG. 5 is a diagrammatic perspective view showing a fiber texture being wound onto the injection mold of the installation of any one of FIGS. 1 to 4.

As shown in FIG. 5, the fiber preform is shaped by winding the fiber texture 210 onto an injection mold 600. The fiber texture 210 is made by three-dimensional or multilayer weaving between a plurality of warp yarns 211 and a plurality of weft yarns 212. The fiber texture 210 forms a strip presenting in cross-section a profile that varies, i.e. a shape that varies and/or a thickness that varies in cross-section. The mold presents a profile in radial section that corresponds to the profile of the part to be made, which in the presently-described example corresponds to an aeroengine fan casing.

To this end, the injection mold 600 presents an outside surface 601 of profile in relief that corresponds to the inside surface of the casing that is to be made. By being wound onto the injection mold 600, the fiber texture 210 matches the shape of its profile. The injection mold 600 also has two cheek plates 620 and 630 for forming portions of the fiber preform that correspond to the flanges of the casing that is to be made. The injection mold 600 is driven in rotation in the direction of rotation $S_{600}$, e.g. by an electric motor (not shown in FIG. 5), while the fiber texture 210 is put under tension between the storage mandrel 300 and the injection mold 600.

The follower roller(s) 400, 400', 400", and 500 placed downstream from the storage mandrel 300 are driven by the fiber texture 210 in respective directions of rotation $S_{400}$, $S_{400'}$, $S_{400''}$, and $S_{500}$ shown in FIGS. 1 to 4. Some follower rollers 400", 500 present across their axial width, i.e. along their respective axes of rotation, a radius that varies so as to define respective outside surfaces 401" and 501 of profiles in relief that correspond to the profile intended for the fiber preform that is to be made.

Each installation 10, 10', 10", 10''' also has a storage mandrel or drum 300, also referred to as the "takeup" mandrel, which is driven in rotation mainly in the direction of rotation $S_{300}$ and which also presents across its axial width a radius that varies so as to define an outside surface 301 that has a profile in relief corresponding to the profile intended for the fiber preform so as to limit deformation of the fiber texture 210 while it is being stored. Although the storage mandrel 300 serves to put the fiber texture under tension while it is being wound, it can happen that its rotation is momentarily stopped or reversed relative to the direction of rotation $S_{300}$ in order to maintain tension on the texture while it is being wound on the injection mold.

In accordance with the invention, each installation 10, 10', 10", and 10''' has at least one adjustment device for adjusting tension on the fiber texture 210. Advantageously, each adjustment device is in contact with the fiber texture 210 and serves to exert or to release tension thereon.

With reference to the various embodiments, and as described below, each tension adjustment device generally comprises at least one row of rods in alignment in a first direction parallel to an axis of rotation of a follower roller 400, 400', 400", or 500. Each rod also presents a free end carrying an endpiece for coming into contact with the fiber texture 210.

One or more rods can then be moved in a second direction orthogonal to the first direction, thereby making it possible to apply tension to the fiber texture 210, or to relax pre-existing tension thereon. In other words, the second direction of a rod corresponds to the axis of that rod.

Thus, in an embodiment, the fiber texture 210 can be wound under tension that is exerted solely by the rods of an adjustment device. During this winding, the storage mandrel and the injection mold 600 then rotate at predefined speeds, always in the same direction of rotation.

Figure 6:
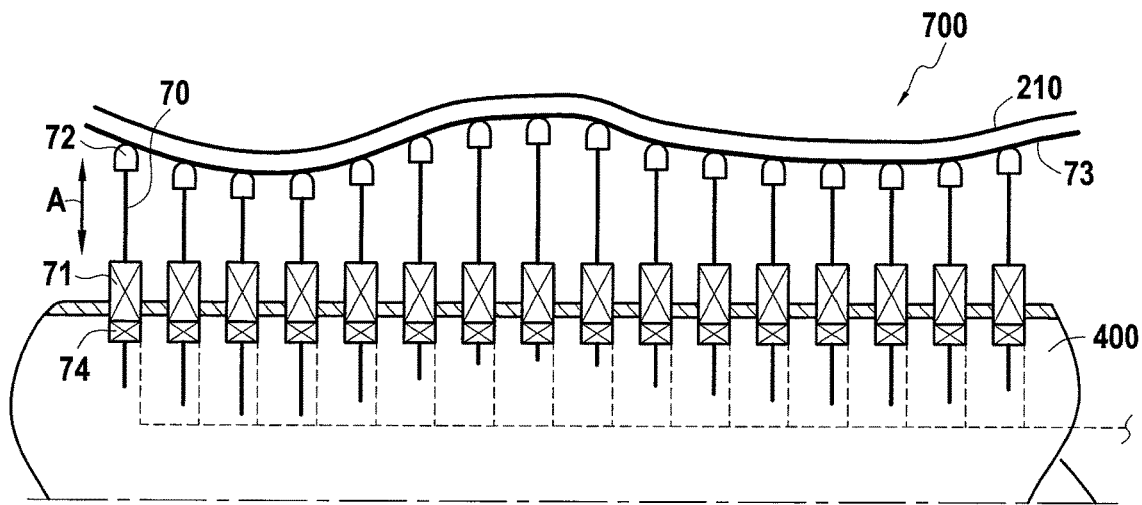
FIG. 6 is a diagrammatic axial section view on plane VI of FIG. 1 showing a follower roller fitted with a tension adjustment device in an embodiment.

FIG. 1 shows a first embodiment of a tension adjustment device 700, and FIG. 6 is a view thereof on section plane VI of FIG. 1. As can be seen in FIGS. 1 and 6, the follower roller 400 is fitted with a tension adjustment device 700.

Figure 7:
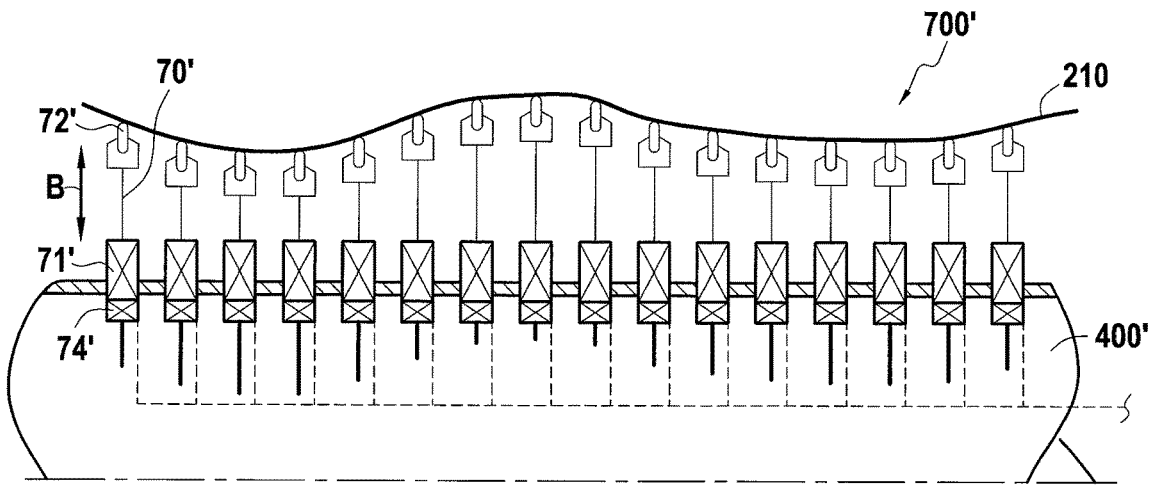
FIG. 7 is a diagrammatic axial section view on plane VII of FIG. 1 showing a follower roller fitted with a tension adjustment device in another embodiment.

FIG. 7 shows a variant embodiment of the adjustment device 700' fitted to a follower roller 400', in section plane VII of FIG. 2.

In these figures, each tension adjustment device 700, 700' comprises a plurality of rows of rods 70, 70' distributed uniformly around the follower roller 400, 400'. The rods 70, 70' in each row are aligned in a first direction parallel to the axis of rotation of the follower roller 400, 400'.

Each rod 70, 70' is mounted on an actuator system 71, 71'. Each actuator system 71, 71' is configured to move its rod 70, 70' in a second direction orthogonal to the first direction, i.e. in this example in a radial direction. Each rod 70, 70' also has an endpiece 72, 72' at its free end for coming into contact with the fiber texture 210.

In the embodiment shown in FIG. 6, each endpiece 72 presents a rounded shape.

In this embodiment, as shown in FIGS. 1 and 6, it is possible to cover the endpieces 72 of the rows of rods 70 in a flexible membrane 73 so as to support the fiber texture 210 travelling over the tension adjustment system 700. Such support may be particularly advantageous depending on the gap left between the rods 70. The flexible membrane 73 is thus deformable, so as to be able to follow the radial movements of the rods 70 together with their endpieces 72.

Thus, in the embodiment shown in FIGS. 1 and 6, the endpieces 72 are in contact with the fiber texture 210 via the flexible membrane 73. In another embodiment that is not shown, the flexible membrane 73 is absent and the rounded endpieces 72 may come directly into contact with the fiber texture 210.

In the embodiment shown in FIGS. 2 and 7, each endpiece 72' presents a castor at the end of each rod 70'. By way of example, each castor is arranged at the free end of each rod 70' via an arm.

In this embodiment, the endpieces 72' then come directly into contact with the fiber texture 210, the castors serving to support the fiber texture 210 travelling over the endpieces 72'.

Whatever the embodiment selected, each rod 70, 70' is also associated with a tension sensor 74, 74' configured to measure the tension it is exerting on its endpiece 72, 72'. By way of example, each tension sensor 74, 74' is connected (dashed lines in FIGS. 6 and 7) to an electronic computer (not shown) serving to control the movement of one or more rods 70, 70' as a function of the tension measurements from each tension sensor 74, 74'. Each actuator system 71, 71' of each rod 70, 70' is thus configured to move its rod 70, 70' in a second direction, specifically the radial direction, as a function of the tension measurement from the sensor 74, 74'.

Advantageously, as a function of the tension measured by each endpiece 72, 72', it is then possible to adjust the tension being exerted locally on the fiber texture 210 by extending or retracting each rod 70, 70' along the second direction. The various movement directions of the rods 70, 70' are represented by double-headed arrows A and B in FIGS. 6 and 7.

In an embodiment, each rod 70, 70' is moved independently in response to the tension measurement from the tension sensor 74, 74' fitted thereto. The movement of each rod 70, 70' via its actuator system 71, 71' is thus controlled individually.

In another embodiment, it is possible to move a set of rods 70, 70' having the same axial position on the follower roller 400, 400' simultaneously in response to the tension measurements from the tension sensors 74, 74' fitted thereto. By way of example, a common movement is applied to the rods 70, 70' presenting the same axial position as a function of a maximum or minimum value for the measured tension as determined from among the set of measurements taken by the tension sensors 74, 74' of the rods 70, 70'. Advantageously, such an embodiment then serves to simplify controlling the movement of the rods 70, 70'.

In various embodiments, one or more follower rollers 400, 400', 500 are fitted with the above-described adjustment device 700, 700'. The follower roller(s) 400, 400', 500, each fitted with a respective adjustment device 700, 700', may also optionally be motor-driven so as to enable them to rotate if the presence of the rods 70, 70' prevents the fiber texture 210 from driving rotation of the rollers.

In another embodiment, the tension adjustment system may be independent of the follower rollers 400, 400', 500. By way of example, the installations 10" and 10''' of FIGS. 3 and 4 include a tension adjustment device 700" that is maintained in a stationary position.

Figure 8:
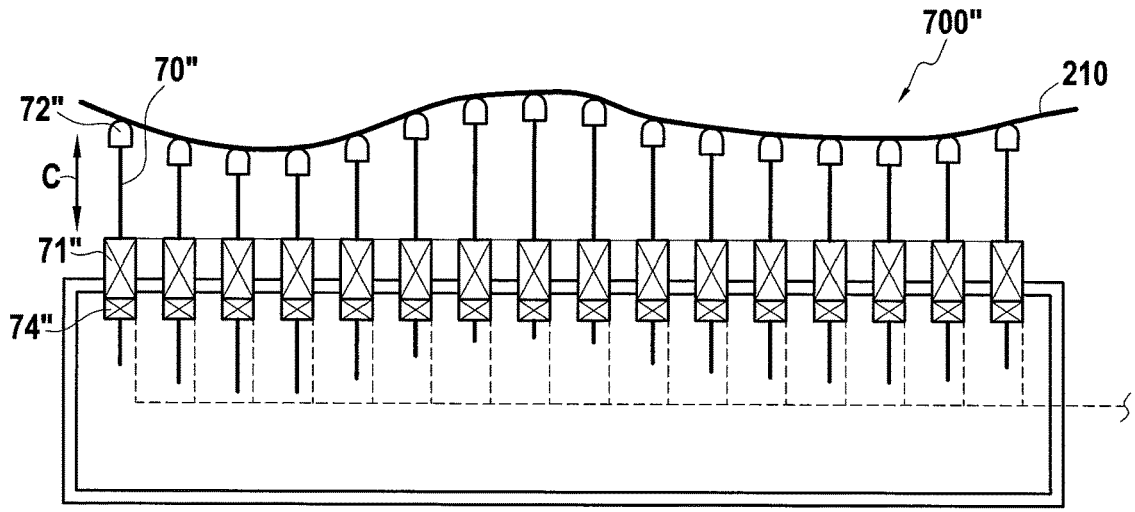
FIG. 8 is an axial section view on plane VIII of FIG. 2 showing a tension adjustment device in another embodiment.

FIG. 8 shows an embodiment of the adjustment device 700" in section plane VIII of FIG. 3.

The device 700" is made up of at least one row of rods 70" in alignment in a first direction parallel to the axis of rotation of a follower roller 400, 400', 400", 500. Each rod 70" is mounted on an actuator system 71' configured to move its rod 70" in a second direction orthogonal to the first direction. Each rod 70" presents an endpiece 72" at a free end for coming into contact with the fiber texture 210. In the embodiment shown, each endpiece 72" is of rounded shape. In another embodiment that is not shown, the endpieces 72" could have castors arranged at the free ends of the rods 70", the castors being carried by means of arms. In the example shown, each endpiece 72" is also directly in contact with the fiber texture 210.

Each rod 70" is also associated with a tension sensor 74" configured to measure the tension it is exerting on its endpiece 72". By way of example, each tension sensor 74" is connected (dashed lines in FIG. 8) to an electronic computer (not shown) for controlling the movement of one or more rods 70" as a function of the tension measurements from each tension sensor 74". Each adjustment system 71" of each rod 70", is thus configured to move along the second direction of its rod 70" as a function of the tension measurement from the tension sensor 74".

In the embodiment of the installation 10" in FIG. 3, the tension adjustment device 700" is used instead of and replacing the follower roller 400, 400'. In the embodiment shown in FIG. 4, the tension adjustment device 700" is arranged between the follower rollers 400" and 500. In general manner, it is possible to arrange the tension adjustment device 700" that is maintained in a stationary position either before or after a follower roller 400, 400', 400", 500 or between two follower rollers 400, 400', 400", 500. In a single installation, it is also possible to arrange a stationary tension adjustment device, such as the adjustment device 700", and also to fit one or more of the follower rollers 400, 400', 400", 500, each with its own tension adjustment device, such as one of the tension adjustment devices 700, 700".

Advantageously, all of the above-described embodiments enable the tension exerted on the fiber texture 210 to be adjusted locally. This tension adjustment may be implemented when the tension adjusted on the fiber texture 210 needs to be modified, e.g. when the difference between the initial profile defined by the outside surface of the mold and the real profile onto which the texture is being wound is such that it can lead to losses of tension at certain axial positions in the texture. It is thus possible to control the application of tension or the relaxing of tension on the fiber texture 210 that is in contact with the endpieces 72, 72', 72" of the tension adjustment devices 700, 700', 700". By way of example, this makes it possible to apply stronger tensions on thicker zones of the fiber texture 210, and weaker tensions on thinner zones, or indeed to release the tension exerted on the fiber texture 210 so as to prevent any slipping or forming of creases in the fiber texture 210 while it is being wound around the injection mold 600.

Thus, by using one or more tension adjustment devices 700, 700', 700" provided with movable rods 70, 70', 70" having their movements servo-controlled relative to the tension measurements from the tension sensors 74, 74', 74"

fitted thereto, the installation and the method of the invention enable axisymmetric fiber preforms to be shaped that present a profile that varies in radial section and in which losses or non-uniformities of tension are reduced significantly. While being wound onto the injection mold, the fiber preform that is being shaped presents few defects (waves, buckling, and/or pinching of fibers, zones of unwanted extra thickness, fiber volume fractions out of specification, creases, misalignments, etc.) compared with a preform shaped in accordance with the prior art in which tension unbalances are greater. This serves to reduce unwanted stops of the winding machine, as are usually necessary in order to correct defects such as creases or collapsing of portions (e.g. the flanges) of the preform, which also require the machine to be reversed, together with action to be taken by one or more technicians.

The invention claimed is:

1. An installation for shaping an axisymmetric fiber preform presenting a profile that varies in radial section, the installation comprising a storage mandrel for storing a fiber texture in the form of a wound strip, one or more follower rollers, and an axisymmetric mold on which the fiber texture is to be shaped by being wound, the one or more follower rollers being placed between the storage mandrel and the axisymmetric mold, the storage mandrel, the one or more follower rollers, and the mold presenting radii along their axes of rotation that vary so as to define outside surfaces presenting respective profiles in relief, wherein the installation comprises at least one tension adjustment device for adjusting tension on the fiber texture, said at least one tension adjustment device comprising at least one row of rods aligned in a first direction parallel to an axis of rotation of one or more follower rollers:
   each rod presenting an endpiece at a free end of said rod in order to come into contact with the fiber texture;
   each rod being mounted on an actuator system configured to move said rod in a second direction orthogonal to said first direction.

2. The installation according to claim 1, wherein each rod is fitted with a tension sensor configured to measure the tension acting on its endpiece, each rod being movable along the second direction as a function of the tension measurement from the sensor.

3. The installation (according to claim 1, wherein the endpiece of each rod is rounded.

4. The installation according to claim 1, wherein the endpiece of each rod comprises a castor.

5. The installation according to claim 1, wherein at least one tension adjustment device is arranged before or after a follower roller, said at least one tension adjustment device being maintained in a stationary position.

6. The installation according to claim 5, wherein said at least one tension adjustment device is arranged between two follower rollers.

7. The installation according to claim 1, wherein at least one follower roller is fitted with a tension adjustment device, said tension adjustment device comprising a plurality of rows of rods distributed uniformly around the follower roller.

8. The installation according to claim 7, wherein said tension adjustment device includes a flexible membrane covering the endpieces of said rods of the rows of rods.

9. A method of shaping a fiber texture obtained by three-dimensional or multilayer weaving to form an axisymmetric fiber preform presenting a profile that varies in radial section, the fiber texture being shaped by being wound under tension onto an axisymmetric mold in order to obtain the fiber preform, the fiber texture being unwound from a storage mandrel, the fiber texture travelling over one or more follower rollers placed between the storage mandrel and the axisymmetric mold, the storage mandrel, each follower roller, and the mold presenting along their axes of rotation radii that vary so as to define an outside surface having a profile in relief, wherein the method comprises adjusting tension on the fiber texture via at least one tension adjustment device, said at least one tension adjustment device comprising at least one row of rods aligned along a first direction parallel to an axis of rotation of the one or more follower rollers:
   each rod presenting an endpiece and a free end for coming into contact with the fiber texture;
   each rod being movable in a second direction orthogonal to said first direction; and
   each rod also being fitted with a tension sensor configured to measure the tension acting on its endpiece, each rod being mounted on an actuator system configured to move the rod along the second direction as a function of the tension measurement from the sensor;
   adjusting the tension of the fiber texture being performed by moving one or more rods following measuring the tension exerted on the endpiece of each rod.

10. The method according to claim 8, wherein each rod is moved independently in response to the tension measurement from the tension sensor fitted thereto.

11. The method according to claim 8, wherein at least one follower roller is fitted with a tension adjustment device, said tension adjustment device comprising a plurality of rows of rods distributed uniformly around the follower roller, the method including moving the rods arranged at a same axial position simultaneously in response to the tension measurements from the tension sensors fitted thereto.

* * * * *